United States Patent [19]

Hammer

[11] Patent Number: 5,324,086
[45] Date of Patent: Jun. 28, 1994

[54] DEVICE CAPABLE OF POSITIVE EXTENSION AND RETRACTION USING A CASADING FORCE TRANSFER

[76] Inventor: Mordechai Hammer, 51A Harav Friedman Street, 62303 Tel Aviv, Israel

[21] Appl. No.: 912,415

[22] Filed: Jul. 13, 1992

[30] Foreign Application Priority Data

Jul. 24, 1991 [IL] Israel .......................................... 98944

[51] Int. Cl.$^5$ ................................................ B25J 1/02
[52] U.S. Cl. .................................. 294/19.1; 15/144.4; 16/115
[58] Field of Search .............. 294/1.4, 1.5, 19.1, 294/22, 23, 57; 15/144.3, 144.4; 16/115; 52/118, 121; 56/332–340; 74/89.2, 89.22, 110, 501.6; 81/53.1–53.12, 177.2; 182/40, 63, 66, 207, 208, 213; 187/9 E; 212/184, 187, 199, 230, 264, 267, 269; 248/157, 161, 333, 404; 403/109; 414/718

[56] References Cited

U.S. PATENT DOCUMENTS

| | | | |
|---|---|---|---|
| 161,010 | 3/1875 | Davis | 182/213 |
| 326,336 | 9/1885 | Sandberg et al. | 212/264 |
| 399,313 | 3/1889 | Bradford | 182/208 |
| 443,968 | 12/1890 | Martinot | 15/144.4 X |
| 925,822 | 6/1909 | Mote et al. | 182/213 |
| 1,384,761 | 7/1921 | Jessup | 294/22 |
| 1,705,625 | 3/1929 | Mitchell . | |
| 2,168,121 | 8/1939 | French . | |
| 2,595,597 | 5/1952 | Morseth . | |
| 2,623,234 | 12/1952 | Brown | 15/144.4 X |
| 2,641,401 | 6/1953 | James | 182/207 X |
| 2,668,386 | 2/1954 | Benner, Jr. . | |
| 2,733,885 | 2/1956 | Crown et al. . | |
| 2,806,467 | 9/1957 | Slaughter . | |
| 2,822,067 | 2/1958 | Price | 52/121 |
| 2,948,363 | 8/1960 | Hopfeld | 182/63 X |
| 2,966,956 | 1/1961 | Campbell et al. | 182/63 |
| 2,980,456 | 4/1961 | McMullin . | |
| 3,076,263 | 2/1963 | Musto . | |
| 3,108,834 | 10/1963 | Cassara . | |
| 3,153,252 | 10/1964 | Ricciardi . | |
| 3,174,634 | 3/1965 | Peck . | |
| 3,188,675 | 6/1965 | Beck . | |
| 3,213,574 | 10/1965 | Melbye et al. | 52/121 |
| 3,248,831 | 5/1966 | Jones | 52/121 |
| 3,266,144 | 8/1966 | Fishlove . | |
| 3,276,805 | 10/1966 | Lambert . | |
| 3,366,406 | 1/1968 | Morris . | |
| 3,396,601 | 8/1968 | Wright . | |
| 3,407,424 | 10/1968 | Lanzarone et al. . | |
| 3,465,899 | 9/1969 | Reuter et al. . | |
| 3,469,712 | 9/1969 | Haulotte . | |
| 3,489,451 | 1/1970 | Guckenberger . | |
| 3,534,867 | 10/1970 | Johnston et al. | 212/264 |
| 3,672,159 | 6/1972 | Sundin . | |
| 3,674,157 | 7/1972 | Fikse . | |
| 3,687,323 | 8/1972 | Pingon . | |
| 3,836,011 | 9/1974 | Sokamoto et al. . | |
| 3,866,257 | 2/1975 | Cansdale . | |
| 3,987,807 | 10/1926 | Varnell . | |
| 4,135,274 | 1/1979 | Freeman . | |
| 4,151,534 | 4/1979 | Bond . | |
| 4,325,157 | 4/1982 | Balint et al. . | |
| 4,388,033 | 6/1983 | Pipes | 212/269 X |
| 4,392,573 | 1/1983 | Gyomrey . | |
| 4,406,375 | 9/1983 | Hockensmith | 212/267 X |
| 4,436,476 | 3/1984 | Yoritomi . | |
| 4,575,976 | 3/1986 | McDermott et al. | 212/269 X |
| 4,982,295 | 2/1991 | Gühne et al. . | |
| 5,088,147 | 2/1992 | MacMillan . | |

FOREIGN PATENT DOCUMENTS

| 1492931 | 8/1967 | France | 212/267 |
| 1580387 | 9/1969 | France | 212/267 |

Primary Examiner—Johnny D. Cherry
Attorney, Agent, or Firm—Mark M. Friedman

[57] ABSTRACT

An extendible-retractable device, which is made up of a number of interconnected members and to which a suitable tool may be attached. The device makes it possible to continually change the position of the tool as a task is being performed. The device includes members which are attached to each other through flexible cables so that relatively small movements of a handle or similar device in the hand of the user results is relatively large extension or retraction movements of the farthest member which carries the tool.

10 Claims, 2 Drawing Sheets

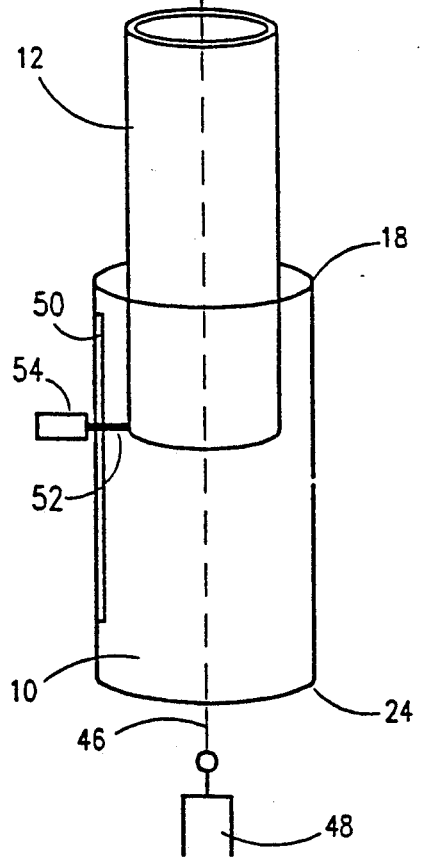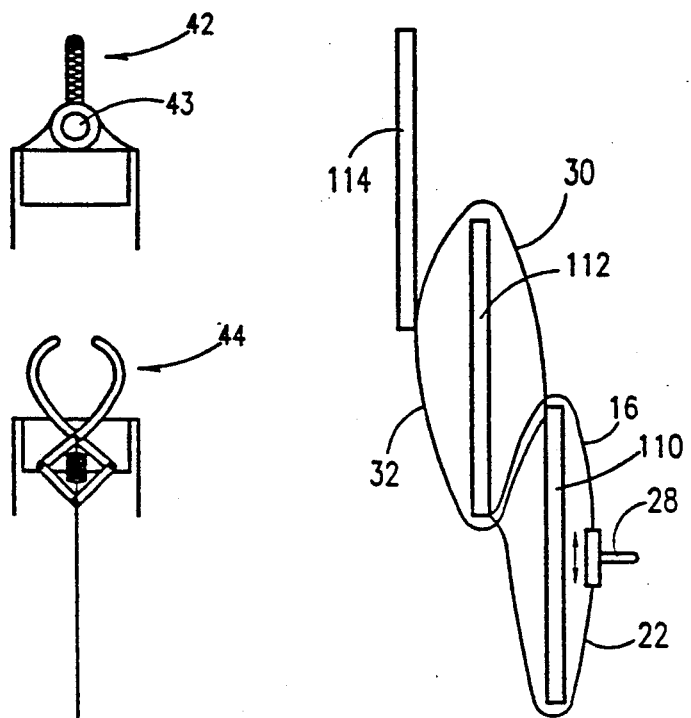
FIG.3
FIG.4

DEVICE CAPABLE OF POSITIVE EXTENSION AND RETRACTION USING A CASADING FORCE TRANSFER

FIELD AND BACKGROUND OF THE INVENTION

The present invention relates to a device which is useful for efficiently extending and retracting a wide variety of tools and, more particularly, to a device made up of a plurality of interacting members which can be easily extended and retracted so as to place in the desired location a tool or other instrumentality attached to the device.

It is often desirable to be able to place and cause to operate a tool or other instrumentality (hereinafter "tool") at a location which is more distant than can be comfortably be reached by extending one's arm with the tool therein. For example, when one wishes to change an incandescent light bulb located in a ceiling which is ten feet tall, it is necessary to grab and rotate the light bulb. To this end one might climb on a ladder and use one's hand to replace the bulb. Alternatively, one could obviate the need to use a ladder by using a sufficiently long pole which had a tool at its end which was capable of grabbing and rotating the bulb. In this case, the operator would remain standing safely on the ground while replacing the light bulb and would carry out the operation through the use of the long pole.

While a pole as described is useful in certain application, it is not free from shortcomings. Primarily, it is known that, unlike the case of replacing a light bulb described above, in many operations the location at which the operation is to take place is not at a fixed distance from the user but varies either discretely or continually during the operation.

For example, if one wished to paint the ten-foot tall walls and the ceiling of a room with a paint roller, means must be at hand for locating the roller at every point on the walls and ceiling. Furthermore, the location of the roller varies instantaneously during each painting stroke, regardless of the position of the painter. One option is to use a hand-held roller and make use of a ladder or scaffolding to reach the top portions of the walls and the ceiling. Another alternative is to mount the roller on a sufficiently long pole which will allow the top portions of the walls and the ceiling to be reached with the painter remaining standing on the floor without requiring the use of a ladder.

One disadvantage of this technique is that the length of a stroke is limited by the distance through which the painter's arms can move, i.e., if the painter is able to translate the pole a distance of three feet, the paint stroke on the wall will be limited to three feet.

A further disadvantage of this technique is that the pole is of fixed length and may therefore be of limited use in other applications. Thus, a five foot pole which may be useful in painting a room having ten-foot high walls and ceiling, may be largely inadequate in painting a room having fifteen-foot high walls and ceiling.

To partially overcome the latter disadvantage and to thereby increase its versatility, it is possible to form the pole from a number of detachable modules. In this way modules could be added or removed before each use so as to produce a pole with overall length which is adequate for the intended task. While the modularization of the pole overcomes certain difficulties, it remains a tedious chore to add or remove modules before each task. More importantly, once a pole of proper length has been assembled, it continues to suffer from the disadvantage described above relating to the limitation on the length of the stroke.

A possible solution is to form a pole made up of a number of interconnected members which are able to move relative to one another and thereby alternately lengthen and shorten the pole. Such a pole may use hydraulic or pneumatic means, not unlike those used in a variety of winches, for example, the system used to position a basket carrying an electrical repairman sufficiently near a transformer as to allow the repairman to work on the transformer. However, such systems are heavy and mechanically complicated and are thus not suitable for a simple hand-held pole for use in properly locating a relatively light tool.

There is thus a widely recognized need for, and it would be highly advantageous to have, an extendible-retractable device which can be actively and positively extended and retracted, as desired by the user, with the device oriented at any angle, to which a tool could be attached and which could be easily used to rapidly vary the length of the pole during the performance of a particular task.

SUMMARY OF THE INVENTION

According to the present invention there is provided an extendible-retractable device, comprising: (a) a first member; (b) a second member movable relative to the first member; (c) a first flexible connector attached to a posterior portion of the second member, the first flexible connector being constrained by and being movable relative to a first location of the first member; and (d) a second flexible connector attached to a posterior portion of the second member, the second flexible connector being constrained by and being movable relative to a second location of the first member, the second location being posterior of the first location, the first flexible connector and the second flexible connector being coupled to each other so that the first flexible connector, the second flexible connector and the second member all move simultaneously.

According to further features in preferred embodiments of the invention described below, there is further provided: (e) a third member movable relative to the first member and the second member; (f) a third flexible connector attached to a posterior portion of the third member, the third flexible connector being constrained by and being movable relative to a first location of the second member, the third flexible connector being attached to a first attachment location of the first member so that anteriorly-directed motion of the second member results in anteriorly-directed motion of the third member; and (g) a fourth flexible connector attached to a posterior portion of the third member, the fourth flexible connector being constrained by and being movable relative to a second location of the second member, the second location being posterior of the first location, the fourth flexible connector being attached to a second attachment location of the first member so that posteriorly-directed motion of the second member results in posteriorly-directed motion of the third member.

According to still further features in the described preferred embodiments the members are nested together and are approximately cylindrical in shape, although the members may not be nested but rather may be arranged next to each other.

According to still further features in the described preferred embodiments, attached to the farthest member is a suitable tool which may be, among many other possibilities, a paint brush, a paint roller, a mop, a dust brush, a cutting tool, a tongs, or a fitting capable of attaching the device to another body.

According to another embodiment according to the present invention there is provided an extendible-retractable device, comprising: (a) a first member formed with a longitudinal slot; (b) a second member movable relative to the first member; (c) a rigid connector attached to a posterior portion of the second member, the rigid connector being slidable through the longitudinal slot of the first member so that the second member is moved whenever the rigid connector is moved; (d) a third member movable relative to the first member and the second member; (e) a third flexible connector attached to a posterior portion of the third member, the third flexible connector being constrained by and being movable relative to a first location of the second member, the third flexible connector being attached to a first attachment location of the first member so that anteriorly-directed motion of the second member results in anteriorly-directed motion of the third member; and (f) a fourth flexible connector attached to a posterior portion of the third member, the fourth flexible connector being constrained by and being movable relative to a second location of the second member, the second location being posterior of the first location, the fourth flexible connector being attached to a second attachment location of the first member so that posteriorly-directed motion of the second member results in posteriorly-directed motion of the third member.

The present invention successfully addresses the shortcomings of the presently known configurations by providing an extendible-retractable device on which can be mounted a suitable tool which can be used to continually change the position of the tool so as to facilitate carrying out the task.

BRIEF DESCRIPTION OF THE DRAWINGS

The invention is herein described, by way of example only, with reference to the accompanying drawings, wherein:

FIG. 3 is yet another device made up of two members and featuring a rigid connector;

FIG. 4 is a device made up of three members which are arranged next to each other rather than inside one another as in FIG. 1.

DESCRIPTION OF THE PREFERRED EMBODIMENTS

The present invention is of a device which can be used to continually change the position of a tool during the operation of the tool. Specifically, the present invention can be used to conveniently and rapidly carry out a large variety of tasks which would otherwise require careful preparation and/or the use of ladders and similar devices. For example, a device according to the present invention can be used to quickly and safely paint entire walls and ceilings while standing on the floor. It can be used to replace light bulbs in the ceiling without having to climb on a ladder or touch the bulb. It can be used to take down a book or a grocery store item located on a high shelf without use of a chair or a ladder.

The principles and operation of an extendible-retractable device according to the present invention may be better understood with reference to the drawings and the accompanying description.

Figure 1:
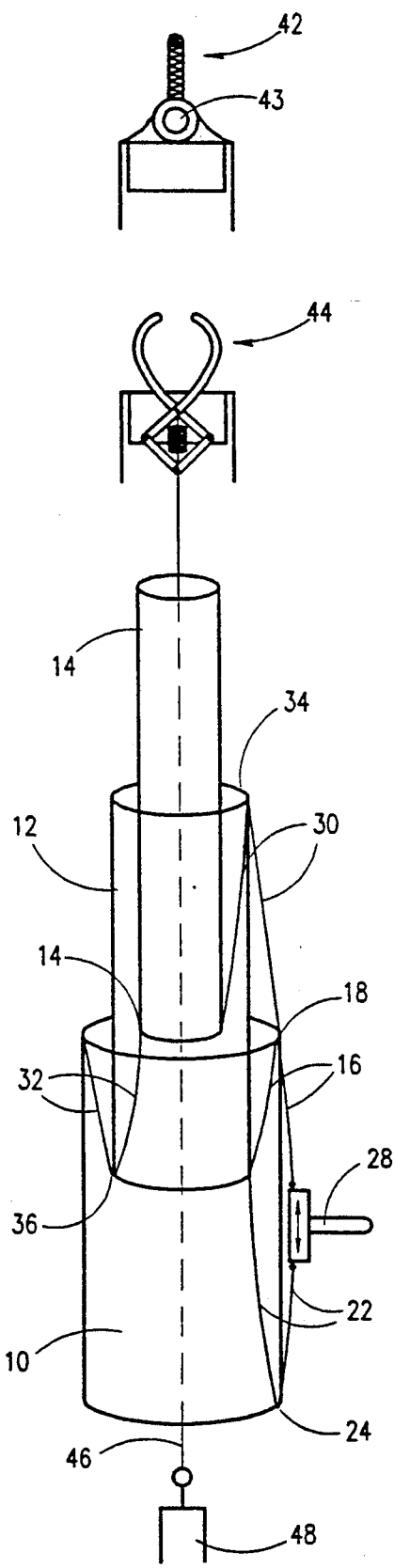
FIG. 1 is a device made up of three members.
Figure 2:
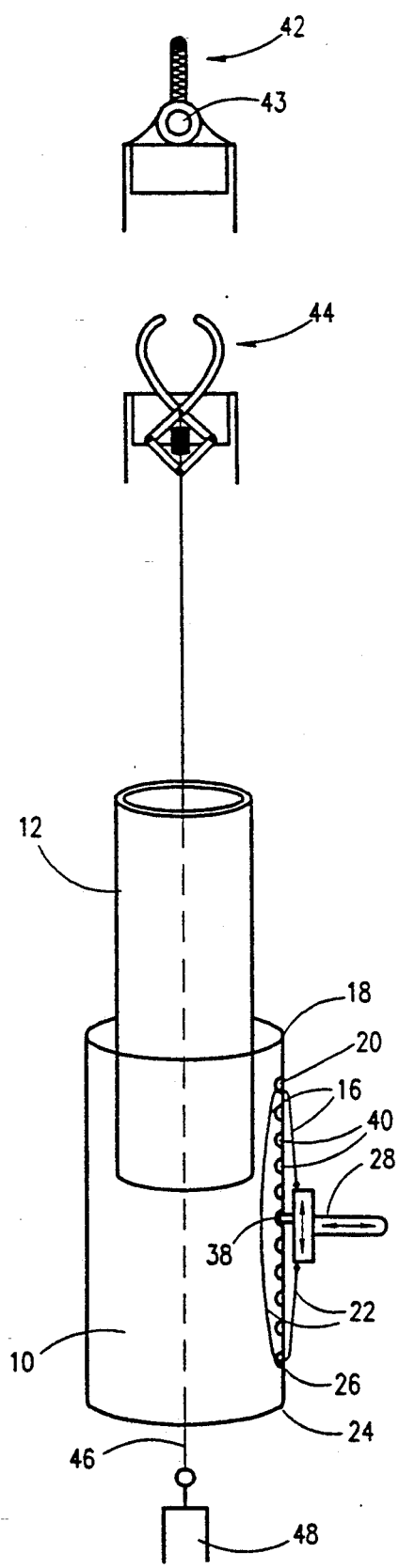
FIG. 2 is another device made up of two members and featuring a detachable handle.

Referring now to the drawing, FIGS. 1 and 2 illustrate two related embodiments of the present invention. The device illustrated includes three members—a first member 10, a second member 12 and a third member 14. The three members are sized and shaped so as that third member 14 fits inside second member 12 which, in turn, fits inside first member 10. Second member 12 and third member 14 are movable parallel to each other and relative to first member 10. The members shown are cylindrical in shape, but any other suitable shape may be used. For example, a system according to the present invention may include a member of square cross section nested within a member of circular cross section. This facilitates the prevention of rotation of one member relative to another. In certain applications, however, it may be desirable to have one member rotate relative to another, either automatically as part of the extension or retraction process (e.g. with the aid of a spiral protrusion on the outside surface of an inner member) or independently controlled by the user. It is not essential that the three members be nested inside each other as will be discussed below in the context of FIG. 4.

A first flexible connector 16, which is preferably a suitable cable, is attached to second member 12, preferably at its posterior portion, most preferably at its posterior edge. The attachment is preferably permanent. First flexible connector 16 then runs from its point of attachment to second member 12 to the adjoining anterior edge 18 of first member 10. It is preferable to include a small pulley wheel (not shown) permanently attached to first member 10 at anterior edge 18 to facilitate movement of first flexible connector 16 and prevent friction and wear of first flexible connector 16. From there, first flexible connector 16 runs posteriorly along the wall of first member 10. Rather than passing over the anterior edge 18 of first member 10, first flexible connector 16 may be made to pass through a first hole 20 (FIG. 2), preferably located near the anterior edge 18 of first member 10, which may, itself include a friction-reducing pulley. In either case, first flexible connector 16 is made to pass through a fixed point on first member 10, preferably located at or near anterior edge 18 of first member 10.

A second flexible connector 22, which is preferably a suitable cable, is also attached to second member preferably at its posterior portion, most preferably at its posterior edge. The attachment is preferably permanent. Second flexible connector 22 then runs from its point of attachment to second member 12 to the adjoining posterior edge 24 of first member 10. It is preferable to include a small pulley wheel (not shown) permanently attached to first member 10 at posterior edge 24 to facilitate movement of second flexible connector 22 and prevent friction and wear of second flexible connector 22. From there, second flexible connector 22 runs anteriorly along the wall of first member 10. Rather than passing under the posterior edge 24 of first member 10, second flexible connector 24 may be made to pass through a second hole 26 (FIG. 2), which is posterior of first hole 20 and which is preferably located near the posterior edge 24 of first member 10, which may, itself include a friction-reducing pulley. In either case, second flexible connector 24 is made to pass through a fixed point on first member 10, preferably located at or near posterior edge 24 of first member 10.

The end of first flexible connector 16 and the end of second flexible connector 22 which are not connected to second member 12 are coupled to each other either directly or indirectly. When coupled directly to each other, the two flexible connectors form, in effect, a single flexible connector. Operation of the device in this case is by alternatively pulling the joined flexible connector anteriorly and posteriorly. Rather than joining the ends of the two flexible connectors, it is clear that it is possible to use a single flexible connector from the start and thereby obviate the need to attach to each other two connectors. Similarly, it is clear that two flexible connectors attached to second member 12 may alternatively be a single connector which is attached to second member 12.

Alternatively, the two ends of flexible connectors 16 and 22 are each attached to opposite ends of a handle 28. Alternatively, a handle 28 may be mounted onto and fixedly connected to a single flexible connector. Flexible connectors 16 and 22 are sufficiently taut that longitudinal motion of handle 28 translates into longitudinal motion in the opposite direction of second member 12. To facilitate use of the device it may be desirable to include a secondary handle (not shown) fixedly connected to first member 10. This secondary handle, which may extend posteriorly from first member 10, or which may form the posterior portion of first member 10, would be intended as a place for the user's other hand, i.e., the hand not used to operate handle 28, to firmly grasp the device and help create the relative motion between handle 28 and first member Handle 28 may be of any suitable design. In the embodiment of FIG. 1, handle 28 hangs on the side of first member 10. In a preferred embodiment, handle 28 is equipped with means for attaching handle 28 to first member 10. Such means may take the form of a protrusion 38 in the surface of handle 28 facing first member 10. Protrusion 38 is sized and shaped so as to fit within one or a series of depressions 40 in the side of first member 10. This mechanism makes it possible to fix the position of handle 28 once the desired extension or retraction has been achieved, and prevents the extent of the extension or retraction from accidentally changing.

In an alternative embodiment according to the present invention, handle 28 is replaced by a winch mechanism (not shown) which is permanently attached to first member 10. Rather than pulling handle 28 anteriorly or posteriorly, the winch is turned to accomplish the same goal. The winch may further include means, such as a ratchet mechanism, for locking the winch in a particular position so as to prevent the members from moving relative to each other.

In the preferred embodiment of FIG. 1, third member 14 is connected to first member 10 through a third flexible connector 30 and a fourth flexible connector 32.

Third flexible connector 30, which is preferably a suitable cable, is attached to third member 14, preferably at its posterior portion, most preferably at its posterior edge. The attachment is preferably permanent. Third flexible connector 30 then runs from its point of attachment to third member 14 to the adjoining anterior edge 34 of second member 12. It is preferable to include a small pulley wheel (not shown) permanently attached to second member 12 at anterior edge 34 to facilitate movement of third flexible connector 30 and prevent friction and wear of third flexible connector 30. From there, third flexible connector 30 runs posteriorly along the wall of second member 12. Rather than passing over the anterior edge 34 of second member 12, third flexible connector 30 may be made to pass through a third hole (not shown), preferably located near the anterior edge 34 of second member 12. In either case, third flexible connector 30 is made to pass through a fixed point on second member 12, preferably located at or near anterior edge 34 of second member 12. The end of third flexible connector 30 is attached to a fixed point, preferably at or near the anterior edge of first member 10, and preferably permanently, in such a way that third flexible connector 30 is always taut so that anteriorly-directed motion of second member 12 results in anteriorly-directed motion of third member 14.

A fourth flexible connector 32, which is preferably a suitable cable, is also attached to third member 14, preferably at its posterior portion, most preferably at its posterior edge. The attachment is preferably permanent. Fourth flexible connector 32 then runs from its point of attachment to third member 14 to the adjoining posterior edge 36 of second member 12. It is preferable to include a small pulley wheel (not shown) permanently attached to second member 12 at posterior edge 36 to facilitate movement of fourth flexible connector 32 and prevent friction and wear of fourth flexible connector 32. From there, fourth flexible connector 32 runs anteriorly along the wall of second member 12. Rather than passing under the posterior edge 36 of second member 12, fourth flexible connector 32 may be made to pass through a fourth hole (not shown), which is posterior of the third hole described above and which is preferably located near the posterior edge 36 of second member 12. The end of fourth flexible connector 32 is attached to a fixed point, preferably at or near the anterior edge 18 of first member 10, and preferably permanently, in such a way that fourth flexible connector 32 is always taut so that anteriorly-directed motion of second member 12 results in anteriorly-directed motion of third member 14. Preferably, third flexible connector 30 and fourth flexible connector 32 are connected to third member 14 at opposing points along its circumference. Similarly, third flexible connector 30 and fourth flexible connector 32 are preferably connected to first member 10 at opposing points along its circumference. Such placement of the attachment points serves to centralize third member 14 and reduce its tendency to engage the walls of second member 12 and produce undesirable frictional forces which tend to impede relative motion of the members. The centralization thus serves to facilitate the extension and retraction of the device. Toward the same ends, it may be preferable to include a number of connected or independent third flexible connectors 30 and/or a number of connected or independent fourth flexible connectors 32 disposed around the periphery of third member 14 to further centralize third member 14. Along the same lines, it may be preferably to utilize a number of connected or independent first flexible connectors 16 and/or a number of connected or independent second flexible connectors 22 disposed around the periphery of first member 10 to further stabilize and centralize second member 12.

A device according to the present invention may be used to carry a tool and place it where the user desires as the task being performed progresses. The variety of tools which can be used in conjunction with an extendible-retractable device according to the present invention is almost limitless. For convenience, they can be classified into passive tools, automatically activated tools, and independently activated tools. In each case, the tool is preferably connected, most preferably detachably, to the furthest member of the device.

Passive tools include those tools which need merely be connected to the furthest member. In this category fall tools such as a paint brush, a paint roller, a mop, a dust brush, and a stationary cutting tool, such as a knife. Also included in this category are various fittings which make it possible to connect the device to another body. For example, the tool could be used as a tripod to support a camera, or as a support for an antenna, or as a bolt onto which a shading member can be screwed to form a beach umbrella. Similarly, the fitting 42 may be such as to make possible the attachment of a second extendible-retractable device, as through an engageable opening 43, which would make it possible to quickly build rigid structures such as a tent.

Automatically activated tools are those which would be activated and deactivated by the very extension or retraction of the extendible-retractable device. For example, in picking fruits which are all at approximately the same height from the ground, it may be desirable to use a clipper which closes and cuts whenever the extendible-retractable device is extended.

Finally, independently activated tools are those which can be activated or operated by the user independently of the current extension or retraction status of the device. Examples might be various cutting tools, shears, scissors, and tongs 44 used to pick up and release various objects. To operate such tools, means would be provided to transmit an independent action by the user to the tool. One such means might be a coaxial cable configuration, such as is used in braking systems for bicycles. Sufficient coaxial cable 46 would be wound on a roller so that the cable could be automatically lengthened and shortened as the device is lengthened and shortened. The coaxial construction of the cable, with the inner cable being able to move relative to the outside tube, would allow the user to operate the tool regardless of the precise extension or retraction status of the device. To operate the tool, the user would move an operating handle 48.

Another alternative configuration is shown in FIG. 3. Here first member 10 features a longitudinal slot 50. A rigid connector 52 is attached to a posterior portion of second member 12. Rigid connector 52 is slidable through longitudinal slot 50 so that second member 12 is moved whenever rigid connector 52 is moved. Rigid connector 52 may be attached to or may include a handle element 54 which is found outside of first member 10. To extend or retract the device, the user would move handle element 54 anteriorly or posteriorly, respectively. Such a mechanism replaces first flexible connector 16 and second flexible connector 22. The interconnections represented by third flexible connector 30 and fourth flexible connector 32 are as described above in the context of the previously discussed embodiments.

Yet another alternative embodiment of a device according to the present invention is shown in FIG. 4. The device is related to that shown in FIG. 1, except that rather than the three members being nested inside one another, the three members of FIG. 4 are arranged along side of each other.

In each of the described embodiments it may be desirable to add one or more springs (not shown) which will tend to facilitate and expedite the extension (or the retraction) of the outlying members. When retracting ( or extending) such a device, sufficient additional force would have to be applied to overcome the opposing force of the springs.

While the invention has been described with respect to several embodiments, it will be appreciated that many variations, modifications and other applications of the invention may be made.

What is claimed is:

1. An extendible-retractable device, comprising:
   (a) a first member having an anterior edge and a posterior edge;
   (b) a second member movable relative to said first member;
   (c) a first flexible connector attached to a posterior portion of said second member, said first flexible connector being constrained by and being movable relative to a first location of said first member;
   (d) a second flexible connector attached to a posterior portion of said second member, said second flexible connector being constrained by and being movable relative to a second location of said first member, said second location being posterior of said first location, said first flexible connector and said second flexible connector being coupled to each other through a coupler which includes a handle so that said first flexible connector, said second flexible connector and said second member all move simultaneously as said coupler is moved axially along said first member, said handle further serving in positioning and stabilizing the device;
   (e) a third member movable relative to said first member and said second member;
   (f) a third flexible connector attached to a posterior portion of said third member, said third flexible connector being constrained by and being movable relative to a first location of said second member, said third flexible connector being fixedly attached to a first attachment location of said first member so that anteriorly-directed motion of said second member results in anteriorly-directed motion of said third member; and
   (g) a fourth flexible connector attached to a posterior portion of said third member, said fourth flexible connector being constrained by and being movable relative to a second location of said second member, said second location of said second member being posterior of said first location of said second member, said fourth flexible connector being fixedly attached to a second attachment location of said first member so that posteriorly-directed motion of said second member results in posteriorly-directed motion of said third member.

2. A device as claim 1 wherein said first member, said second member and said third member are nested so that said third member is within said second member and said second member is within said first member.

3. A device as in claim 2 wherein said first member, said second member and said third member are approximately cylindrical.

4. A device as in claim 2 wherein said first attachment location and said second attachment location are on opposite sides of said first member.

5. A device as in claim 1 wherein said first member, said second member and said third member are arranged next to each other.

6. A device as in claim 1 wherein said flexible connectors are cables.

7. A device as in claim 1 wherein said first location of said first member is the anterior edge of said first member and said second location of said first member is the posterior edge of said first member.

8. A device as in claim 1 wherein said coupling of said first flexible connector and said second flexible connector to each other is achieved through a movable handle.

9. A device as in claim 1, further comprising:
(h) a tool attached to said third member.

10. A device as in claim 9 wherein said tool is activated remotely by the user.

* * * * *